INVENTOR.
JAMES B. LINDSAY
BY M. Ralph Shaffer
HIS ATTORNEY

Nov. 18, 1969 J. B. LINDSAY 3,479,115
APPARATUS FOR DETAILING TOPOGRAPHIC MAPS IN ACCORDANCE
WITH AERIAL PHOTOGRAPHS OF TOPOGRAPHY
Filed Nov. 10, 1966 6 Sheets-Sheet 2

*INVENTOR.*
JAMES B. LINDSAY

BY *M. Ralph Shaffer*

HIS ATTORNEY

Nov. 18, 1969    J. B. LINDSAY    3,479,115
APPARATUS FOR DETAILING TOPOGRAPHIC MAPS IN ACCORDANCE
WITH AERIAL PHOTOGRAPHS OF TOPOGRAPHY
Filed Nov. 10, 1966    6 Sheets-Sheet 5

INVENTOR.
JAMES B. LINDSAY
BY
HIS ATTORNEY

FIG. 24

United States Patent Office 3,479,115
Patented Nov. 18, 1969

1

3,479,115
APPARATUS FOR DETAILING TOPOGRAPHIC
MAPS IN ACCORDANCE WITH AERIAL
PHOTOGRAPHS OF TOPOGRAPHY
James B. Lindsay, 328 South 10th East,
Salt Lake City, Utah 84102
Filed Nov. 10, 1966, Ser. No. 593,413
Int. Cl. G03b 21/00
U.S. Cl. 353—6         7 Claims

ABSTRACT OF THE DISCLOSURE

An apparatus for relating and detailing topographic maps in accordance with aerial photographs of topography. The apparatus has a pair of projectors having three degrees of pivotal freedom and being constructed to move toward or away from a translucent panel. The translucent panel includes on its surface a topographic map. The user is provided with controls at his drawing position whereby he can selectively pivot the projectors about one or more axes and also translate the projectors so that the projected image is registered with a corresponding portion of a topographic map he is detailing. Then by stereoscopically viewing stereoscopically related images of a given portion of terrain being studied and detailed the user may trace and detail for effective depth perception the topographic map being worked upon. The respective orientations of the projectors are controlled electrically and are conveniently adjusted to provide for exact registration of one projected image with a corresponding portion of the topographic map, and an exact adjustment of the remaining image so that the user may see both images in exact stereoscopic registry.

The present invention relates to detailing of topographic maps and, more particularly, to a new and improved apparatus and new method by means of which one may superimpose and detail on a topographic map, and in proper registration, a stereoscopically viewed, photographically-reproduced topographic scene.

Specifically, the present invention utilizes the concept of, first, serially photographing from the air, adjacent and/or overlapping sectors of the earth's surface. From these aerial photographs are produced a series of slides which, by virtue of scene-sector displacement, are respectively, stereoscopically related. The images of these slides are next projected onto the surface of a translucent, topographic map. The projection apparatus is made adjustable such that from proper focusing and proper spacing of the projectors from the topographic map, there may be projected at least one of the images in proportion and position registration with that portion of the topographic map being detailed.

The user is provided with a mirror stereoscope through which he views both stereoscopically-related image scenes. The result is a depth and detail perception which can be faithfully traced and reproduced onto that portion of the topographic map under consideration. Thus, depth and contours can be displayed so that the topographic map includes a faithful reproduction in detail of the actual features present in the photographed terrain, as seen from above.

Accordingly, a principal object of the present invention is to provide an apparatus which is easily operated by one person, for use in reproducing photographed scenes onto topographic maps.

A further object of the invention is a method for superimposing a stereoscopically-viewed scene onto a portion of a topographic map under study.

2

An additional object is to provide apparatus which is suitably adjustable in all necessary degrees of freedom in such a way that the user, by suitable controls, may align and realign the topographic map with the projection system, and/or vice versa, so that there is a faithful positioning and registry of the projected scene with the topographic map, both with respect to scale and also position.

Another object is to provide a system and method by means of which the user may identify the exact geographic position of a scene to be superimposed over a topographical map of a given area, this by using aerial photographs previously taken of the earth's surface of the subject area and of its nature and condition.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1:
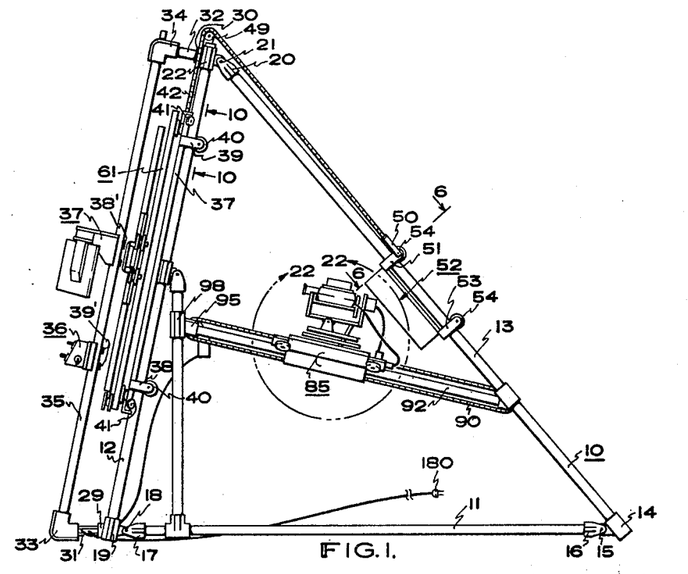
FIGURE 1 is a side elevation of an apparatus incorporating the principles of the present invention.
Figure 2:
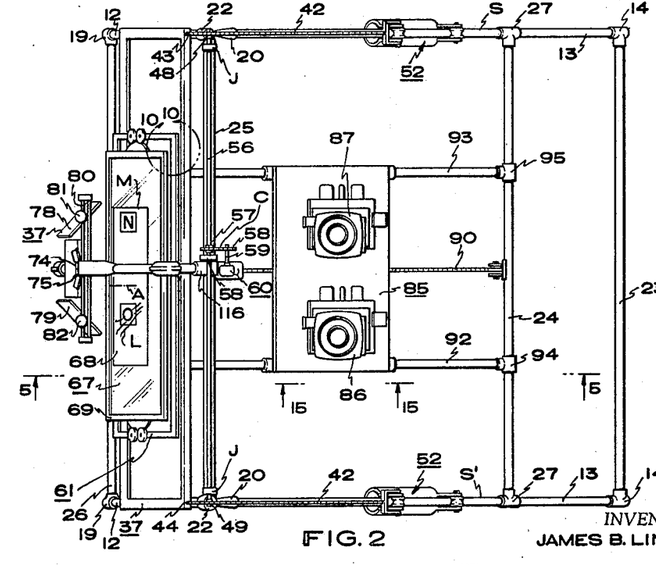
FIGURE 2 is a plan view of the structure shown in FIGURE 1.

In FIGURE 1 frame 10 of the equipment is shown to be a tubular structure preferably composed of a pair of base members 11 (one on each side), a pair of front members 12, and a pair of back members 13. As seen in FIGURE 1, these members are secured together by suitably designed end fittings and clevis connectors. For example, end fittings 14 are supplied the rearward ends of each of the back members 13. These are respectively pivoted by pivot means 15 to end-fitting clevis connectors 16, the latter being secured to the rearward ends of base members 11. In a corresponding manner, clevis connectors 17 are pinned or otherwise pivotally affixed by suitable means 18 to end fittings 19. Clevis connectors 17 may be simply thrust onto the forward ends of base members 11. Correspondingly, end fittings 19 are positioned over the lower ends of front members 12. In considering the upper portion of the structure it is seen that a pair of clevis connectors 20 are respectively secured to the upper ends of back members 13, are pivoted by pin means 21 to end fittings 22, and the latter are thrust onto and secured to the upper ends of front members 12. The two sides S and S' of the structure, as seen in FIGURE 2, are mutually secured together by cross braces 23, 24, 25, and 26, the ends of which are mutually secured into end fittings 14, 27, 22, and 19, respectively. End fittings 27 for the cross brace 24 are simply sleeve T's which are pressed over or otherwise affixed to members 13 as shown in FIGURE 2.

Figure 3:
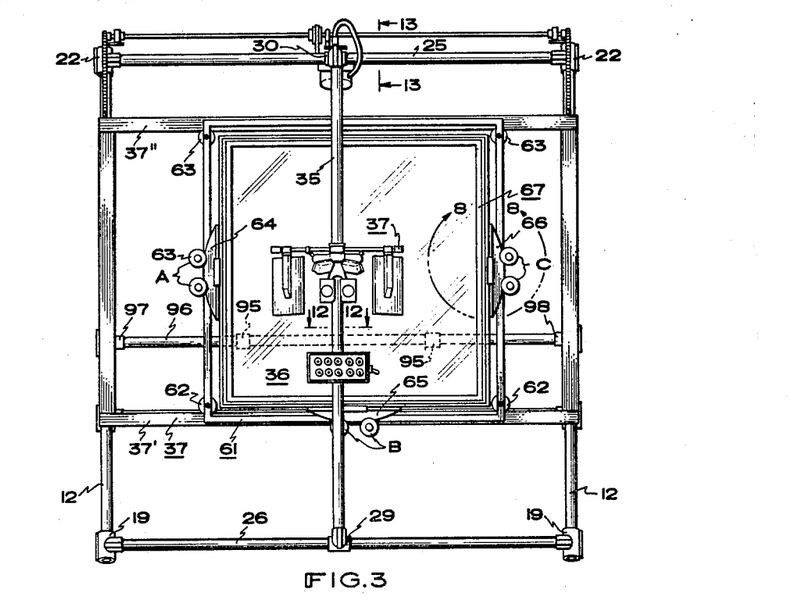
FIGURE 3 is a front view of the apparatus illustrated in FIGURES 1 and 2.

FIGURE 3 illustrates that end fittings 29 and 30 likewise comprising T connectors and are affixed to tubular cross braces 25 and 26. Stubs 31 and 32 are fitted into the end fittings 29 and 30, and each are provided with elbows 33 and 34, respectively. These elbows are respectively affixed to opposite ends of optical and control systems' support 35. Optical system 37 is secured to the support 35 by means of a suitable optical system bracket 37 and bolts 38' as indicated in FIGURE 1. Correspondingly, bolts 39' secure the control unit 40' to tubular support member 35.

Attention is now turned to the front structure of the apparatus. The support rack 37 includes clevis brackets 38 and 39 which respectively include respective wheels 40 journaled thereto. Askew wheels 41 are likewise affixed to the support rack structure 37 and ride upon the front surfaces of respective front members 12. Counterweight chains 42 are supplied at each side S and S' of the structure and are respectively secured at 43 and 44 to support rack 37. The respective counterweight chains loop over and engage sprockets 48 and 49 on opposite sides of the structure, and are each tied by respective clevis connections 50 to a respective, counterweight sleeve bracket 51. Each side of the structure is provided with a counterweight 52 which includes brackets 51 and 53 as indicated. The respective brackets journal pulley wheels 54 which ride along the respective back members 13.

The pulleys 48 and 49 (see FIGURE 2) are secured to opposite ends of shaft 56 proximate shaft journals J, the latter being mounted to cross brace 25. Shaft 56 includes a keyed sprocket 57 fixedly mounted thereto and medially thereon. This sprocket may be disposed proximate a journal bearing 58, mounted to cross brace 25 and through which shaft 56 passes. Sprocket 57 cooperates via sprocket chain C with sprocket 58, the latter being connected to output shaft 59 of motor and gear reduction unit 60.

The counterweights 52 are designed to counter-balance the weight of the support rack 37 and structure attached thereto. Hence, energization of the motor and gear unit 60 will produce a revolvement of sprockets 57 and 58, on shaft 56, and hence of sprockets 48 and 49. This in turn produces a translational movement of the two chains 42 which in turn produce an upward or downward movement of the support rack 37.

Mounted on support rack 37 is a horizontally translatable support frame 61. Horizontal support frame 61 is movable horizontally back and forth over the lower cross member 37' of support rack 37. This is accomplished through the provision of horizontal movement wheels 62 and 63 which, as seen in FIGURE 3, are pivotally journaled to the horizontal support frame 61 and which revolvingly engage the upper and lower transverse members 37'' and 37' of support frame 37.

Pivotally secured by suitable brackets or otherwise to the support frame 61 are plural, rotational movement wheels 63 comprising sets A, B, and C. These wheels preferably take the form of pulley wheels which engage, in tongue and groove relationship, the circular segments 64, 65, and 66 which are attached to transparent planar map support 67. Map support 67 of course will include a transparent working panel 68 and a frame circumscribing and encasing the former 69. Circular segment rotation tracks 64, 65, and 66 may be bolted or otherwise secured to the transparent planar map support 67 and preferably to the frame 69 thereof.

Figure 4:
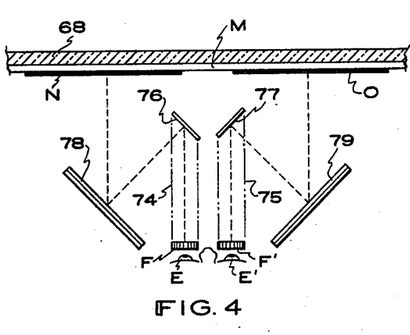
FIGURE 4 is a schematic diagram, in plan, of a simplified form of mirror-stereoscope which is used in practicing the invention.

FIGURE 4 illustrates a simplified optical diagram of the system which pertains to the optical system at 37 in FIGURE 1, known as simply a mirror stereoscope. One suitable for utilization in the present structure is manufactured by Kail & Associates in Denver, Colo. Basically, the stereoscope includes a set of eye pieces 74 and 75, each of which includes 45°-oriented mirrors 76 and 77. The structure suspends corresponding mirrors 78 and 79 which are designed to receive light from scenes N and O to the mirrors 76 and 77 and from thence to the front portions F and F' of respective eye pieces 74 and 75, this for viewing by the observer's eyes E and E'. It is noted in FIGURE 2 that the mirrors 78 and 79 may be adjusted back and forth along the frame 80 of the stereoscopic device by the simple loosening of positioning knobs 81 and 82 which operate in a strictly conventional manner. A more detailed description of the operation of the mirror stereoscope will be set forth hereinafter.

The controlled, up-and-down movement of support rack 37 has been described heretofore. Correspondingly, it has been seen that the support frame 61 is horizontally translatable, transversely over the support rack 37. Finally, rotational displacement adjustment is provided through the provision of wheels 63 (sets A, B, and C) and their co-action with circular segments 64–66. The ultimate object of the various adjustments is to achieve a proper orientation of the transparent planar map support 67 with respect to the projector carriage 85 and the projectors 86 and 87 mounted thereon. The latter and their movement will be described hereinafter. At this point it is sufficient to note that the transparent planar map support 67 is adjustable up and down through the provision of motor and gear box 60, and is likewise translatable back-and-forth through the manual movement of support frame 61; furthermore, pivotal displacement orientation and re-orientation can be achieved through the manual movement of transparent planar map support 67 about the central axis A which is common to the circular segments 64–66. Hence, the support 67 enjoys three degrees of freedom as to orientation, two translational and one rotational.

Various details of the structure will now be described. Projector carriage 85 supports the projectors 86 and 87 which are slide projectors of the turret-type. The slide projectors are preferably electronically controlled in the usual manner as to slide-feed and may comprise the slide projectors currently manufactured by Kodak and going under the name of Carousel 800. At this point it is sufficient to note that the projector carriage 85 is provided with fore and aft eye bolts 88 and 89 pinned to opposite extremities of chain 90. Chain 90 traverses sprockets 91 and 92, see FIGURE 5, which are journaled to frame 13, and loops under the structure as indicated. A projector carriage motor 93 includes a gear box 94, shown in fragmentary view, which drives the sprocket 92 in a conventional manner. See FIGURES 2 and 5 in this regard. Thus, actuation of projector carriage motor 93 will cause a movement of the projector carriage drive chain 90 and hence a movement of the projector carriage 85 over projector support rails 92 and 93. In the latter regard, the projector support rails may simply comprise tubes which are provided with suitable end fittings 94 and 95. These end fittings may be pressed, bolted or otherwise affixed to transverse tubular support brace 24. Tubular support brace 24 may be fitted into similar ends of connector fittings 27 in the manner shown in FIGURE 2.

The front ends of projector support rails 92 and 93 are fitted into respective end fittings 95 which may comprises sleeve T's (as indicated in dotted lines in FIGURE 3) mounted to tubular cross brace 96. Tubular cross brace 96 itself may have end fittings 97 and 98, constituting suitable sleeve T's as indicated in FIGURE 1. Accordingly, the support rails 92 and 93 are supported from the structure and provides for the projector carriage 85. Energization of motor 93 in FIGURE 5, again, produces a translation of the projector carriage 85 over support rails 92 and 93.

Figure 6:
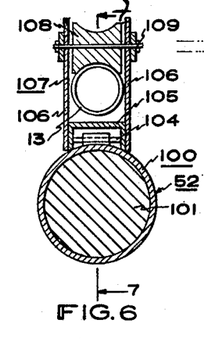
FIGURE 6 is an enlarged, transverse section taken along the line 6—6 in FIGURE 1.
Figures 7, 12:
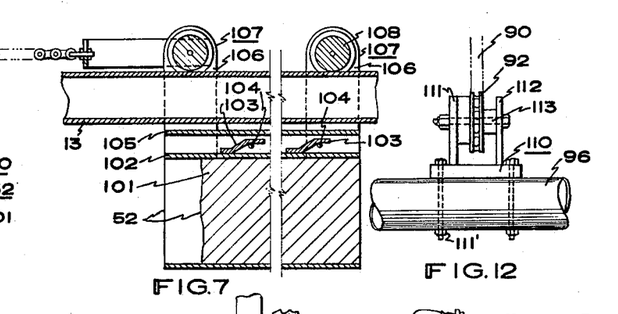
FIGURE 7 is a fragmentary section taken along the line 7—7 in FIGURE 6.
FIGURE 12 is an enlarged fragmentary plan of a portion of the structure and is taken along the line 12—12 in FIGURE 3.

The figures now to be described illustrate slight variations of the structure previously discussed. As seen in FIGURE 6, the counterweight 52 may comprise simply a tube 100 filled with a suitable material such as lead 101. The wall 102 of tube 100 is provided with catches 103. The circumferential wall 102 in having catches 103 may be directly mounted to pins 104 of bracket 105 in an easy, removable manner. Pins 104 are secured by the respective U-shaped brackets 105 which in turn are welded to plates 106 of the bracket assemblies 107. Each bracket assembly 107 includes a pulley wheel 108 journaled by bolt 109 in a conventional manner; thus, each bracket assembly 107 is respectively slidable along a respective back member 13. FIGURE 7 is a sectioned, cut-away view, looking from the right-hand side of FIGURE 6 and illustrates the structure in more detail.

Figure 8:
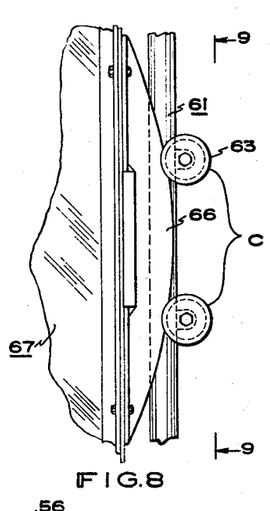
FIGURE 8 is an enlarged fragmentary detail taken along the line 8—8 in FIGURE 3.
Figure 9:
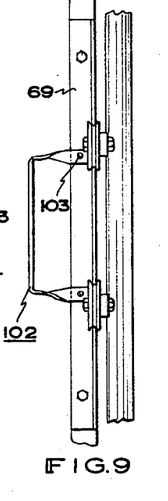
FIGURE 9 is a fragmentary elevation taken along the line 9—9 in FIGURE 8.

FIGURES 8 and 9 illustrate additional structure, in particular, the specific co-action of the circular segments such as 66 with the pulley wheels 63 affixed to horizontal frame 61. It will be seen that a slight manual rotation of the transparent, planar map support 67 is accommodated through the journaling of pulley wheels 63 to horizontal support frame 61.

FIGURE 9, being a view taken along the line 9—9 in FIGURE 8, illustrates a handle 102 which can be used for both translational and rotational movements. Handle 102 is affixed by the usual nut and bolt attachments 103 to frame 69 in the manner indicated.

Figures 10, 11:
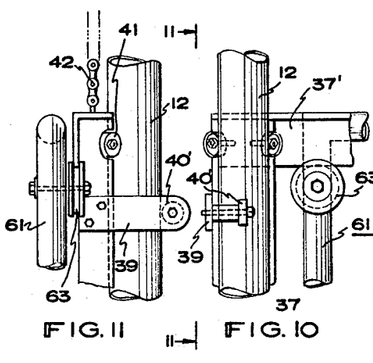
FIGURE 10 is an enlarged, fragmentary view taken along the line 10—10 in FIGURE 1, illustrating the parts and co-action thereof of the translatable frame and the structure upon which it moves.
FIGURE 11 is a fragmentary elevation taken along the line 11—11 in FIGURE 10.

FIGURES 10 and 11 illustrate the co-action of support frame 61 with support rack 37. It is seen that the support frame 61 moves back and forth with respect to support rack 37, and that the latter is translatable up and down the respective front members 12. Contoured wheels 40', corresponding to wheels 40 in FIGURE 1, may also be provided.

Figure 5:
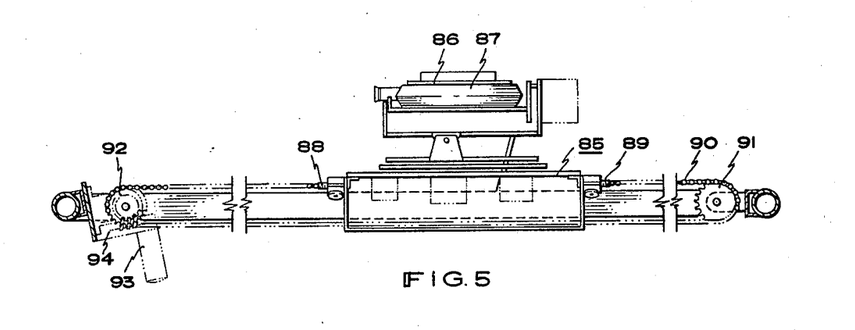
FIGURE 5 is an enlarged view taken along the line 5—5 in FIGURE 2.

FIGURE 12 illustrates the manner in which a sprocket 92, see FIGURE 5, may be mounted to the structure. In particular, a bracket 110 is provided with bolt attachments 111' which secure the bracket 110 to transverse support 96. Bracket 110 includes upstanding ears 111 and 112 which provide for a bolt or pivot pin 113, the latter being fixedly secured to sprocket 112 and enabling the latter to cooperate with the chain 90.

Figure 13:
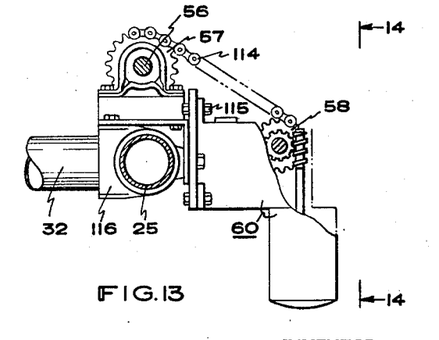
FIGURE 13 is an enlarged fragmentary section taken along the line 13—13 in FIGURE 3.

FIGURE 13 illustrates the manner in which the combined motor and gear box 60 may be used to drive shaft 56. It is seen, in particular, that sprockets 57 and 58, before mentioned, are mutually engaged by endless sprocket chain 114. The motor and gear box 16 may be bolted by suitable bolt attachments 115 to members 25 and 35 by end fitting 116. See also FIGURE 2.

Figure 14:
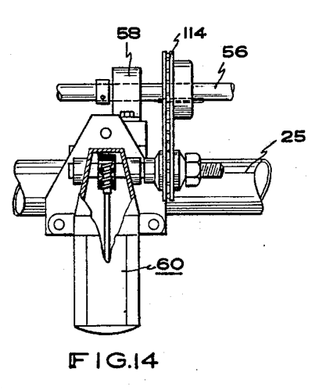
FIGURE 14 is an elevation taken along the line 14—14 in FIGURE 13.

FIGURE 14 is a view from the right-hand side of FIGURE 13, which further illustrates the described parts employed.

Figure 15:
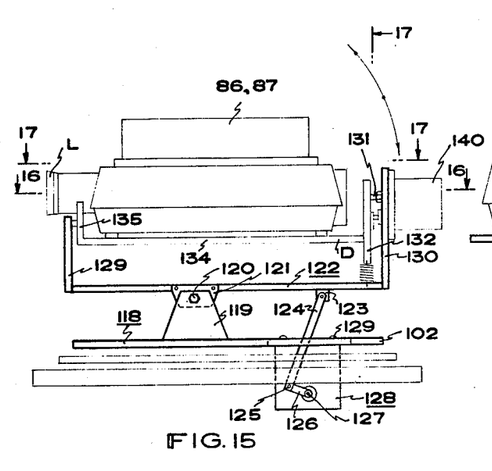
FIGURE 15 is a simplified elevation taken along the line 15—15 in FIGURE 2. Parts indicated in darkened lines are detailed as to cooperation, as is also the case in subsequent figures.
Figure 16:
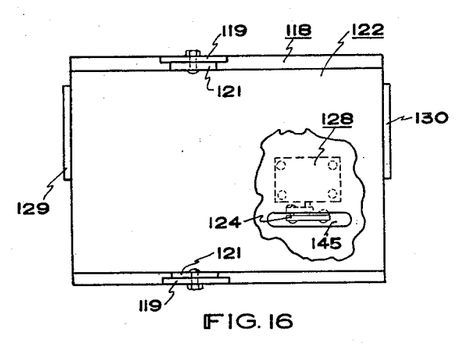
FIGURE 16 is a plan taken along the line 16—16 in FIGURE 15, the dark-lined objects of FIGURE 15 being shown to be under study.

In FIGURES 15 and 16 it is seen that each of the projectors 86, 87 includes a horizontal base 118 having a pair of aligned, upstanding members 119 which mutually receive pivot bolt 120. The pivot bolt extends through corresponding members 121 affixed to opposite sides of base 122. Depending tab 123 is affixed to base 122, depends downwardly therefrom, and provides a pivot connection for lever 124. Lever 124 is pivoted by pin 125 to lever 126. Lever 126 is affixed to the output shaft 127 of motor 128; the latter is secured by attachments 129 to the bottom of base 118. Accordingly, if base 118 is considered to be horizontal and fixed for the moment, then it is seen that the individual projectors 84, 87 will pivot about the respective pivot axes of pivot bolts 120 (one being shown). This is accomplished through the rotation of motor shaft 27 upon the energization of motor 128. Rotation of the shaft operates the lever system comprising levers 124 and 126, so as to pull downwardly and push inwardly, alternately, the base 122 via the connection of tab 123.

Figure 17:
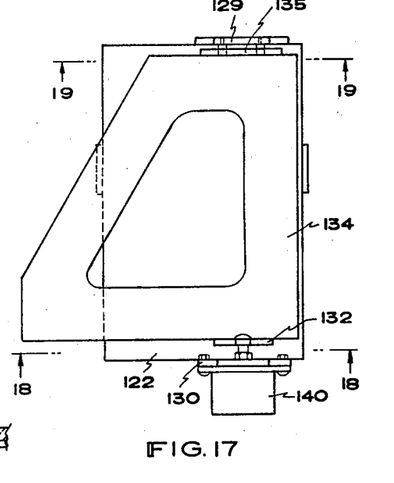
FIGURE 17 is a plan taken along the line 17—17 in FIGURE 15, illustrating solely the details and cooperation of certain other structure therein.
Figure 18:
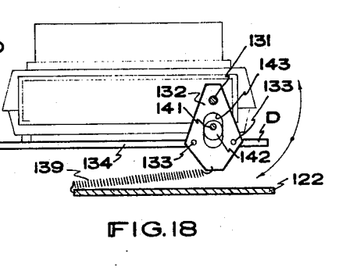
FIGURE 18 is an elevation taken along the line 18—18 in FIGURE 17.
Figure 19:
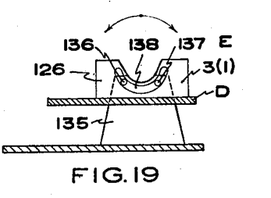
FIGURE 19 is a fragmentary section taken along the line 19—19 in FIGURE 17.

Base 122 includes upstanding members 129 and 130, the latter including a pivot pin 131 which is connected to member 132. Member 132 is rigidly affixed via bolts 133 to base 134, the latter also includes upstanding member 135 at the forward end thereof. Member 135 includes rotatable rollers 136 and 137 which fit into the circularly curved slot 138 of upstanding member 126. FIGURE 18 illustrates that a spring 139, a preloading spring, is affixed to and between plates 132 and 122 as shown. Motor 140 is rigidly secured to upstanding member 130 and includes an output shaft 141 to which a cam 142 is pinned. Cam 142 operates in a cam slot 143 associated with member 132. Thus, rotation of motor shaft 141 through energization of motor 140 produces, via cam 142, a pivoting of member 132 about the pivot pin 131. This, in turn, operates to produce a pivoting of the entire projector structure including base 134 about the axis of pivot pin 131. Of course, the projectors 86, 87 will be fixedly secured to base 134 by conventional means. The base 118 will include a slot 145 for admitting the lever 124. FIGURE 16, of course, does not show the structure including base 134, its attachments, and the projectors 86 and 87, for convenience of illustration.

In operation, then, FIGURES 15 and 16 illustrate the tipping of the projector about an axis (i.e., the axis of pivot bolt 120) which is transverse to the line of projection through lens L. In contrast, the tilting to the right and left of the projector is accomplished through the movement of cam 142 as a result of the actuation of motor 140 and the motor shaft 141. This accomplishes a tilting of the projector about an axis parallel to yet spaced from the line of sight of the projector.

Figure 20:
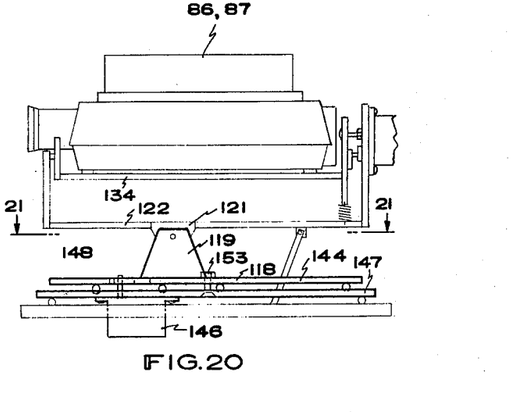
FIGURE 20 is a view similar to FIGURE 15, but illustrates in dotted lines certain other structure employed to facilitate re-orientation of the projector about a transverse horizonal axis.
Figure 21:
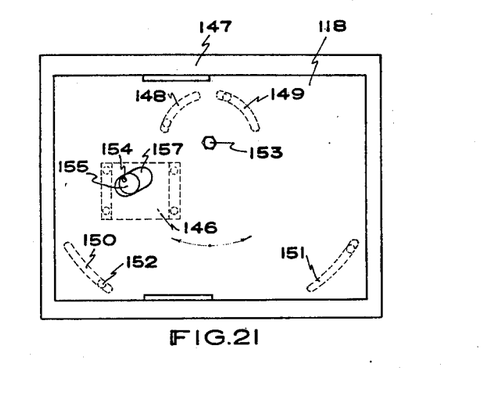
FIGURE 21 is a plan taken along the line 21—21 in FIGURE 20.

FIGURES 20 and 21 illustrate one manner of rotational revolvement which may be incorporated with the projectors 86, 87. Thus, motor 146 may be bolted to plate 147 which includes circular grooves 148–151. Bearing balls 152 are disposed in each of the grooves and accommodate rotational displacement about pivot bolt 153. Pivot bolt 153 pivotally attaches the plates 118 and 147. Motor 146 includes output shaft 154 to which cam 155 is affixed. The plate 118 includes a slot 157 for cam 155. Accordingly, revolvement of the motor shaft 154 accomplishes a pivotal movement of plate 118, relative to plate 147, about pivot axis 153.

Figure 22:
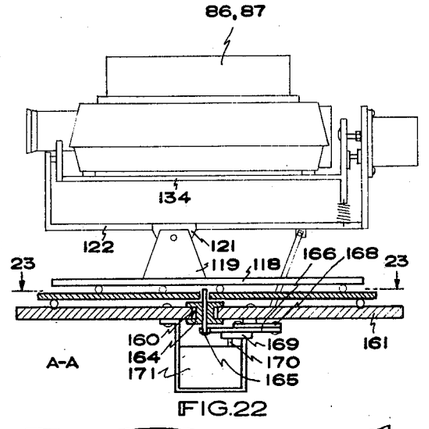
FIGURE 22 is similar to FIGURE 20, but illustrates in darkened lines further structure used specifically to translate the projector horizontally and in a direction transverse to the projector direction.
Figure 23:
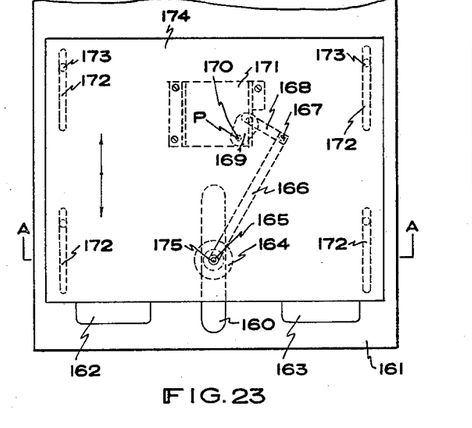
FIGURE 23 is a plan of certain structure shown in FIGURE 22 and is taken along the line 23—23 in FIGURE 22.

FIGURES 22 and 23 illustrate another degree of freedom incorporated in the apparatus. As seen in FIGURE 3 there is provided slot 160 in a base plate 161. The slot also includes clearance holes 162 and 163. A guide roller 164 is included in the structure, see FIGURES 22 and 23, and a pivot pin 165 couples the same to lever arm 166. The latter is pivoted at 167 to lever 168 (comprising a link), and lever 168 is engaged with a lever 169, coupled at P, to motor shaft 170 of motor 171. As before, the base plate 161 includes grooves 172 for receiving bearing balls 173. The bearing balls support the upper plate 174 which receives at aperture 175 the combination pivot and positioning pin 165.

In operation, FIGURES 22 and 23 illustrate that the respective projector may be moved from side to side in accordance with the rotation of motor shaft 170 and the consequent movement of levers 168, 166, and the pin 165 fitted within aperture 175.

Figure 24:
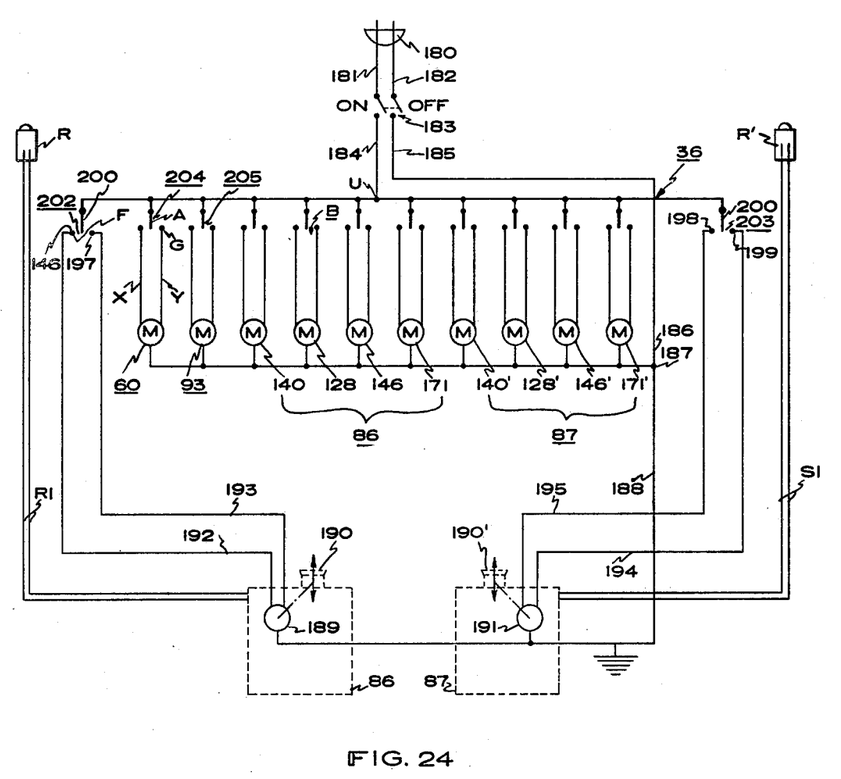
FIGURE 24 is a simplified schematic showing one type of control system which may be utilized in practicing the invention.

FIGURE 24 illustrates a general schematic of the electrical system which may be employed in the invention. Electrical input plug 180 is coupled by leads 181 and 182 through double-pole, single-throw switch 183 to leads 184 and 185. Lead 184 is connected to switch arm A of each of the single-pole, double-throw switches B associated with the motor controls. Leads X and Y of each of the motors (indicated additionally by the letter M enclosed within the motor circle) are coupled to switch contacts F and G, as indicated, for the respective switches B. The specific motors heretofore described are herein shown schematically, to wit, motors 60, 93, 140, 128, 146, and 171. The latter four motors are related to the operation of projector 86, and corresponding motors 140', 128', 146', and 171', will be provided, in an identical manner, for projector 87. The ground side of each of the motors may be connected by a common lead 186 to junction 187. Common lead 188 is also connected to this junction to provide a ground return for motors 189 and 191 which are built into each of the projectors, for focusing the respective lens systems thereof at 190 and 190'. Dual-winding, motor reversal leads 192 and 193, and 194 and 195 are connected to switch contacts 196, 197 and 198, 199, as indicated. Switch arms 200 and 201 of the respective switches 202 and 203 are coupled back to junction U which is common to switch arms A and lead 184.

In operation, focusing is accomplished through the use of switches 202 and 203. For the two projectors 86 and 87, the switch arms will be thrown in one direction (e.g. toward the left-hand contacts) when, for example, the lens system is to be advanced forwardly for proper focusing onto the topographic map supported by member 67. Correspondingly, these switch arms will be thrown in a reverse direction when the respective projector lens systems are to be withdrawn, for proper focusing onto the topographic map. Thus, focusing may be accomplished independently from the two projectors 86 and 87, and will be operated as appropriate in conjunction with the spacing of projectors 86 and 87, see FIGURE 2, relative to the topographic map M mounted upon translucent frame member 67. The distance between the projectors and the topographic map is, of course, controlled by the motor and gear box assembly 93 through the switch 205. Switch 205, as before noted, controls the forward and reverse movements of the projector carriage 85 upon which projectors 86 and 87 are mounted. Up and down movement of the counterweight system and the frame structure 67 and 37 is accomplished through the actuation of switch 204 and motor and gear box assembly 60. As to the remaining motors, in recapitulation, motor 140 controls the pivoting of a respective projector about a horizontal axis parallel to the lens axis; motor 128 controls the dipping and elevating of the projector about the axis of pin or bolt 120 in FIGURE 15; motor 146 controls the pivoting of the projector about the axis of pivot bolt 153 in FIGURE 21; and motor 171 controls the transverse displacement laterally of the respective projector, as shown in FIGURE 23. Identical functions are performed by the motors 140', 128', 146', and 171' as regards the remaining projector 187. The structure as regards these motors and their connections to the projector system will be identical to that disclosed with respect to projector 186 in FIGURES 16–23.

In considering the over-all operation of the equipment, then, it is seen that, preliminarily, a regular succession of photographs will be taken, by an airborne camera, of adjacent sectors of the earth's surface. Preferably, these photographs will be regularly successive as to scene-sector images so that every other one may be used for making slides for one projector, i.e. 86, and the remaining photographs utilized to produce slides for the remaining projector 87. Slide change controls R and R1 may be identical and are standard equipment for remotely changing slides of the projectors 86 and 87 and come as standard equipment with these projectors, a represent nomenclature for which has been previously given. The electrical systems R1 and S1 for each of these controls are strictly conventional and come with the equipment.

Thus, images N and O will be projected by the projectors 86 and 87 onto translucent topographic map M having the usual topographic lines L which may be elevation lines. Since the slide series for the respective projectors 86 and 87 is staggered, i.e., projector 86 will have slides, Nos. 1, 3, 5, 7, whereas projector 87 will have slides, Nos. 2, 4, 6, 8, and so forth, and since the aerial photographs will have been taken at the same altitude and of successive scene sectors, progressively, of the earth's topography, then when slides #1 and #2 form images N and O, the images may be seen stereoscopically through the system 75 by the user. If image N is formed by slide 1 and image O formed by slide 2, then an actuation of control unit R' will substitute slide 3 for slide 1 in projector 87 to form a new image N.

Thus, the user, in perceiving stereoscopically the spaced images N and O, will be enabled to trace the detail of the topography, i.e., layers, stratification, rivers and other delineations of terrain, over the topographic map M proximate the image O. It is to be noted that the projectors may be moved back and forth as above described and re-focused so that the scale and position of the image O, for example, is in respective correspondence with the topography as shown on map M.

Hence, the end result is that the user can trace all of the detail, as aforementioned, onto the topographic map and to render the same, in a sense, three dimensional, the user easily interpreting from the stereoscopic effect produced the detail of the scenes projected by the slides.

Slight reorientations as the map-making proceeds is accomplished through actuation of the alignment motors, as has been previously described with reference to FIGURE 24.

While the structure 67 is translucent, the panel 68 thereof is preferably transparent and may comprise clear-plate glass. The topographic map M may be composed of Mylar or other translucent material, which constitutes an objective and through which the images formed at N and O can be seen.

Various portions of the map may be sketched upon by translating the structure at 61 back and forth as previously described. Reorientations of the map relative to the scenes may also be accomplished through the pivoting of panel 67 in accordance with the structure shown in FIGURES 1 and 3, as has been explained, and by actuation of the various motors as previously described.

While particular embodiments of the present invention have been shown and described, it will be obvious to those skilled in the art that changes and modifications may be made without departing from this invention in

I claim:

1. In combination, a support structure; a translucent panel mounted upon said support structure and having inner and outer surfaces; a translucent topographic map releasably affixed to said translucent panel at its outer surface; a pair of projector means, spaced from and facing said inner surface of said support panel, for projecting spaced, stereoscopically-related, photographically-reproduced images of the earth's surface, corresponding to portions of said topographic map, onto said translucent, topographic map such that one of said images is in scale and position correspondence with a chosen portion of said translucent topographic map; means for translating said projector means toward and away from said translucent panel; means for rotationally displacing said projector means independently about any of three respective coordinate axes; and stereoscope means for viewing said images and said chosen portion of said translucent topographic map, to permit the user to trace said one image, as stereoscopically seen through said stereoscope means, onto said chosen portion of said translucent topographic map.

2. The combination of claim 1 wherein said projectors are selectively adjustable as to spacing from said translucent panel and as to focusing onto said topographic map, said combination including electrical means proximate said stereoscope means to enable the user to control remotely, by said means, the projector means as to spacing from and orientation with respect to said translucent panel and as to focusing onto said topographic map.

3. The combination of claim 1 wherein said support structure includes a pair of parallel, horizontal rails nominally positioned parallel to the projection axes of said projection means toward said translucent panel, said combination including carriage means engaging said horizontal rails and supporting said projector means, and a remote control electrical means, controlled proximate the location of said stereoscopic means, for selectively moving said carriage means back and forth along said parallel, horizontal rails.

4. In combination, a support structure; a translucent panel mounted upon said support structure and having inner and outer surfaces; a translucent topographic map releasably affixed to said translucent panel at its outer surface; a pair of projector means, spaced from and facing said inner surface of said support panel, for projecting spaced, stereoscopically-related, photographically-reproduced images of the earth's surface, corresponding to portions of said topographic map, onto said translucent, topographic map such that one of said images is in scale and position correspondence with a chosen portion of said translucent topographic map; and mirror-stereoscope means for viewing said images and said chosen portion of said translucent topographic map, to permit the user to trace said one image, as stereoscopically seen through said mirror-stereoscope means, onto said chosen portion of said translucent topographic map, wherein said mirror-stereoscope means is centrally affixed to and in front of said support structure, said translucent panel and support structure having inter-cooperating means for enabling the horizontal, translational displacement across said support structure and in front of said mirror-stereoscope means, wherein said support structure includes a horizontally-adjustable support frame, said translucent panel being pivotally affixed to said support frame, and wherein said translucent panel includes circular segments on its side and bottom, said support frame including wheel pairs engaging said circular segments for enabling the pivotal displacement of said translucent panel about a central axis passing therethrough.

5. In combination, a support structure; a translucent panel mounted upon said support structure and having inner and outer surfaces; a translucent topographic map releasably affixed to said translucent panel at its outer surface; a pair of projector means, spaced from and facing said inner surface of said support panel, for projecting spaced, stereoscopically-related, photographically-reproduced images of the earth's surface, corresponding to portions of said topographic map, onto said translucent topographic map such that one of said images is in scale and position correspondence with a chosen portion of said translucent topographic map; and mirror-stereoscope means for viewing said images and said chosen portion of said translucent topographic map, to permit the user to trace said one image, as stereoscopically seen through said mirror-stereoscope means, onto said chosen portion of said translucent topographic map, wherein said mirror-stereoscope means is centrally affixed to and in front of said support structure, said translucent panel and support structure having intercooperating means for enabling the horizontal, translational displacement across said support structure and in front of said mirror-stereoscope means, wherein said support structure includes a horizontally-adjustable support frame, said translucent panel being pivotally affixed to said support frame, wherein said projectors are selectively adjustable as to spacing from said translucent panel and as to focusing onto said topographic map, said combination including means proximate said mirror-stereoscope means to enable the user to control remotely, by said means, the projector means as to spacing from said translucent panel and as to focusing onto said topographic map, and wherein each of said projector means includes means for rotationally displacing said projector means about chosen, respective horizontal axes.

6. In combination, a support structure; a translucent panel mounted upon said support structure and having inner and outer surfaces; a translucent topographic map releasably affixed to said translucent panel at its outer surface; a pair of projector means, spaced from and facing said inner surface of said support panel, for projecting spaced, stereoscopically-related, photographically-reproduced images of the earth's surface, corresponding to portions of said topographic map, onto said translucent, topographic map such that one of said images is in scale and position correspondence with a chosen portion of said translucent topographic map; and mirror-stereoscope means for viewing said images and said chosen portion of said translucent topographic map, to permit the user to trace said one image, as stereoscopically seen through said mirror-stereoscope means, onto said chosen portion of said translucent topographic map, wherein said mirror-stereoscope means is centrally affixed to and in front to said support structure, said translucent panel and support structure having intercooperating means for enabling the horizontal, translational displacement across said support structure and in front of said mirror-stereoscope means, wherein said support structure includes a horizontally-adjustable support frame, said translucent panel being pivotally affixed to said support frame, wherein said projectors are selectively adjustable as to spacing from said translucent panel and as to focusing onto said topographic map, said combination including means proximate said mirror-stereoscope means to enable the user to control remotely, by said means, the projector means as to spacing from said translucent panel and as to focusing onto said topographic map, and wherein said projector means each include means for translationally displacing laterally said projector means with respect to said support structure.

7. In combination, a support structure; a translucent panel mounted upon said support structure and having inner and outer surfaces; a translucent topographic map releasably affixed to said translucent panel at its outer surface; a pair of projector means, spaced from and facing said inner surface of said support panel, for projecting spaced, stereoscopically-related, photographically-reproduced images of the earth's surface, corresponding to portions of said topographic map, onto said translucent, topograhic map such that one of said images is in scale and position correspondence with a chosen portion of said translucent topographic map; and mirror-stereoscope means for viewing said images and said chosen portion of said translucent topographic map, to permit the user to trace said one image, as stereoscopically seen through said mirror-stereoscope means, onto said chosen portion of said translucent topographic map, wherein said mirror-stereoscope means is centrally affixed to and in front of said support structure, said translucent panel and support structure having intercooperating means for enabling the horizontal, translational displacement across said support structure and in front of said mirror-stereoscope means, and wherein said support frame includes counter-weight means for counterbalancing the weight of said support frame and translucent panel, means co-acting with said support structure for enabling said support structure to support the combined weight of said counter-weight means and said translucent panel and support frame, and means for selectively raising and lowering said translucent panel in front of said mirror-stereoscope means.

References Cited

UNITED STATES PATENTS

| | | |
|---|---|---|
| 1,396,047 | 11/1921 | Nistri. |
| 1,565,413 | 12/1925 | Brock et al. |
| 2,090,270 | 8/1937 | Swanson. |
| 2,125,553 | 8/1938 | Fourcade. |

NORTON ANSHER, Primary Examiner

ROBERT P. GREINER, Assistant Examiner

U.S. Cl. X.R.

353—7